United States Patent
Kim

(10) Patent No.: US 11,624,811 B2
(45) Date of Patent: Apr. 11, 2023

(54) APPARATUS AND METHOD FOR INCREASING LIDAR SENSING DISTANCE

(71) Applicant: HYUNDAI MOBIS CO., LTD., Seoul (KR)

(72) Inventor: Young-Kyun Kim, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 637 days.

(21) Appl. No.: 16/697,581

(22) Filed: Nov. 27, 2019

(65) Prior Publication Data

US 2020/0241120 A1 Jul. 30, 2020

(30) Foreign Application Priority Data

Dec. 7, 2018 (KR) .......................... 10-2018-0156991

(51) Int. Cl.
*G01S 7/4861* (2020.01)
*G01S 17/10* (2020.01)
*G01S 7/4865* (2020.01)

(52) U.S. Cl.
CPC ............ *G01S 7/4861* (2013.01); *G01S 17/10* (2013.01); *G01S 7/4865* (2013.01)

(58) Field of Classification Search
CPC ...... G01S 7/4861; G01S 17/10; G01S 7/4865; G01S 7/4813; G01S 7/487; G01S 7/4873; G01S 7/4868; G01S 7/4876
See application file for complete search history.

(56) References Cited

U.S. PATENT DOCUMENTS

| 2012/0194798 | A1* | 8/2012 | Crawford | ................ G01S 17/14 356/4.02 |
| 2018/0259625 | A1* | 9/2018 | Gnecchi | ................ G01S 7/4873 |
| 2018/0284246 | A1* | 10/2018 | LaChapelle | ....... H01L 27/14643 |

FOREIGN PATENT DOCUMENTS

| JP | 2641903 B2 | 8/1997 |
| KR | 10-2015-0029087 A | 3/2015 |
| KR | 10-2018-0064826 A | 6/2018 |

OTHER PUBLICATIONS

Korean Office Action dated Apr. 6, 2020 from the corresponding Korean Application No. 10-2018-0156991, 7 pp.

\* cited by examiner

*Primary Examiner* — Thanh Luu
*Assistant Examiner* — Monica T Taba
(74) *Attorney, Agent, or Firm* — Morgan, Lewis & Bockius LLP

(57) ABSTRACT

An apparatus for increasing a lidar sensing distance may include a controller having a signal processor to process a noise signal. In particular, the signal processor includes: an amplifier which amplifies the noise signal, a comparator which is connected to the amplifier and receives the amplified noise signal to compare the amplified noise signal with a threshold, a digital-to-analog converter which inputs the threshold to the comparator, and an analog-to-digital converter which is connected between the amplifier and the comparator and receives the amplified noise signal from the amplifier to input the received amplified noise signal to the controller. The controller may control the digital-to-analog converter on the basis of the amplified noise signal.

14 Claims, 2 Drawing Sheets

APPARATUS AND METHOD FOR INCREASING LIDAR SENSING DISTANCE

CROSS-REFERENCE TO RELATED APPLICATION

This application claims priority to and the benefit of Korean Patent Application No. 10-2018-0156991, filed on Dec. 7, 2018, the entire contents of which are incorporated herein by reference.

FIELD

The present disclosure relates to a lidar apparatus, and a method for increasing a lidar sensing distance.

BACKGROUND

The statements in this section merely provide background information related to the present disclosure and may not constitute prior art.

Light Detection and Ranging (LIDAR) is a technology that measures a distance using a laser, and has been developed in a form of establishing and visualizing topographical data for constructing three dimensional (3D) information of geographic information system (GIS) and applied to construction industries, defense industries, etc., while recently attracting attention as a core technology as applied to autonomous vehicles and mobile robots.

In particular, a LIDAR apparatus for a vehicle is an apparatus to perform a warning or automatic vehicle control on the basis of measuring a distance between a traveling vehicle (e.g., a host vehicle) and a preceding vehicle in real time so that the host vehicle can avoid collision with the preceding vehicle or minimize an impact of the collision. Such a LIDAR apparatus is used as the most essential components among main components of a vehicle distance sensor system for autonomous vehicles such as a lidar/radar, an image sensor and a communication 3D map.

Such a LIDAR apparatus uses a laser diode (LD) and a photodiode (PD) for sensing a distance between vehicles or between obstacles. More specifically, light emitted from the laser diode hit an object and returned, and then a reflected light is absorbed in the photodiode, which converts it into current to output a signal. At this time, a time of flight thereof is calculated by checking a time of a signal interval of the between the light emitted from the laser diode and the returned light.

However, we have discovered that if a reflected wave signal which has hit the object, returned to and received by the photodiode is weak in a step of calculating the time of flight, the object may not be recognized. Since a magnitude of the reflected wave signal decreases due to a light energy loss as the distance increases, a detected distance may not be accurate due to a decrease in magnitude of the reflected wave signal.

SUMMARY

The present disclosure provides an apparatus and a method for increasing a lidar sensing distance.

An apparatus for increasing a lidar sensing distance according to one form of the present disclosure may include: a controller including a signal processor to process a noise signal. The signal processor may include: an amplifier which amplifies the noise signal, a comparator which is connected to the amplifier and receives the amplified noise signal to compare the amplified noise signal with a threshold, a digital-to-analog converter which inputs the threshold to the comparator, and an analog-to-digital converter which is connected between the amplifier and the comparator and receives the amplified noise signal from the amplifier to input the received amplified noise signal to the controller. The controller may control the digital-to-analog converter on the basis of the amplified noise signal.

In one form, the controller may control the digital-to-analog converter to adjust the threshold based on the amplified noise signal.

In another form, the controller may be configured to receive the noise signal at predetermined time intervals and control the digital-to-analog converter to adjust the threshold.

In other form, the controller may be configured to receive external environmental information in addition to the noise signal and control the digital-to-analog converter to adjust the threshold.

In one aspect of the present disclosure, the amplifier may include a transimpedance amplifier (TIA) and a programmable gain amplifier (PGA).

In one form, the signal processor may be configured to process a reflected wave signal reflected from an object to which a laser pulse is applied. The laser pulse is transmitted from a laser diode included in a lidar sensor.

In another form, the noise signal input to the signal processor may be configured to be applied to the signal processor without driving the laser diode. Further, the controller may be configured to receive the noise signal to adjust the threshold and then receive the reflected wave signal to calculate a time of flight.

In other form, a method for increasing a lidar sensing distance using a lidar apparatus including a controller having a signal processor may include: receiving, by the signal processor, a noise signal; monitoring, by the controller, the noise signal; and adjusting, by the controller, the threshold based on the monitored noise signal.

In one aspect, the adjusting the threshold may include: controlling the digital-to-analog converter on the basis of the noise signal to adjust the threshold.

Also, the controller may receive the noise signal at predetermined time intervals and control the digital-to-analog converter to adjust the threshold.

In one form, the method includes: after receiving the noise signal, receiving a reflected wave signal from an object after operating a lidar sensor, and calculating a time of flight based on the reflected wave signal.

In one form, the noise signal may be input to the signal processor without operating the lidar sensor.

In other form, a lidar system according includes: a laser diode which transmits a laser pulse, a photodiode which receives a noise signal and a reflected wave signal reflected from an object to which the laser pulse is applied, and a controller which controls the laser diode and the photodiode. The controller includes a signal processor which processes the noise signal. The signal processor includes: an amplifier which amplifies the noise signal, a comparator which is connected to the amplifier and receives the amplified noise signal from the amplifier to compare the amplified noise signal with a threshold, a digital-to-analog converter which inputs the threshold to the comparator, and an analog-to-digital converter which is connected between the amplifier and the comparator and receives the amplified noise signal from the amplifier to input the received amplified noise signal to the controller. The controller may control the digital-to-analog converter on the basis of the amplified noise signal.

Since the apparatus for increasing a lidar sensing distance, the method for increasing a lidar sensing distance, and the lidar system according to one form of the present disclosure configured as described above can monitor the noise signal and dynamically adjust the threshold in real time on the basis of the monitored noise signal, the reflected wave signal can be sensed even when a magnitude of the reflected wave signal received by the photodiode of the lidar sensor is reduced.

As a result, a sensing distance which is limited due to a decrease in the magnitude of the reflected wave signal resulting from an increase in distance, an obstacle or the like can be increased, and an object that has not been sensed can also be sensed. Also, the scope of the present disclosure is not limited by these effects.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
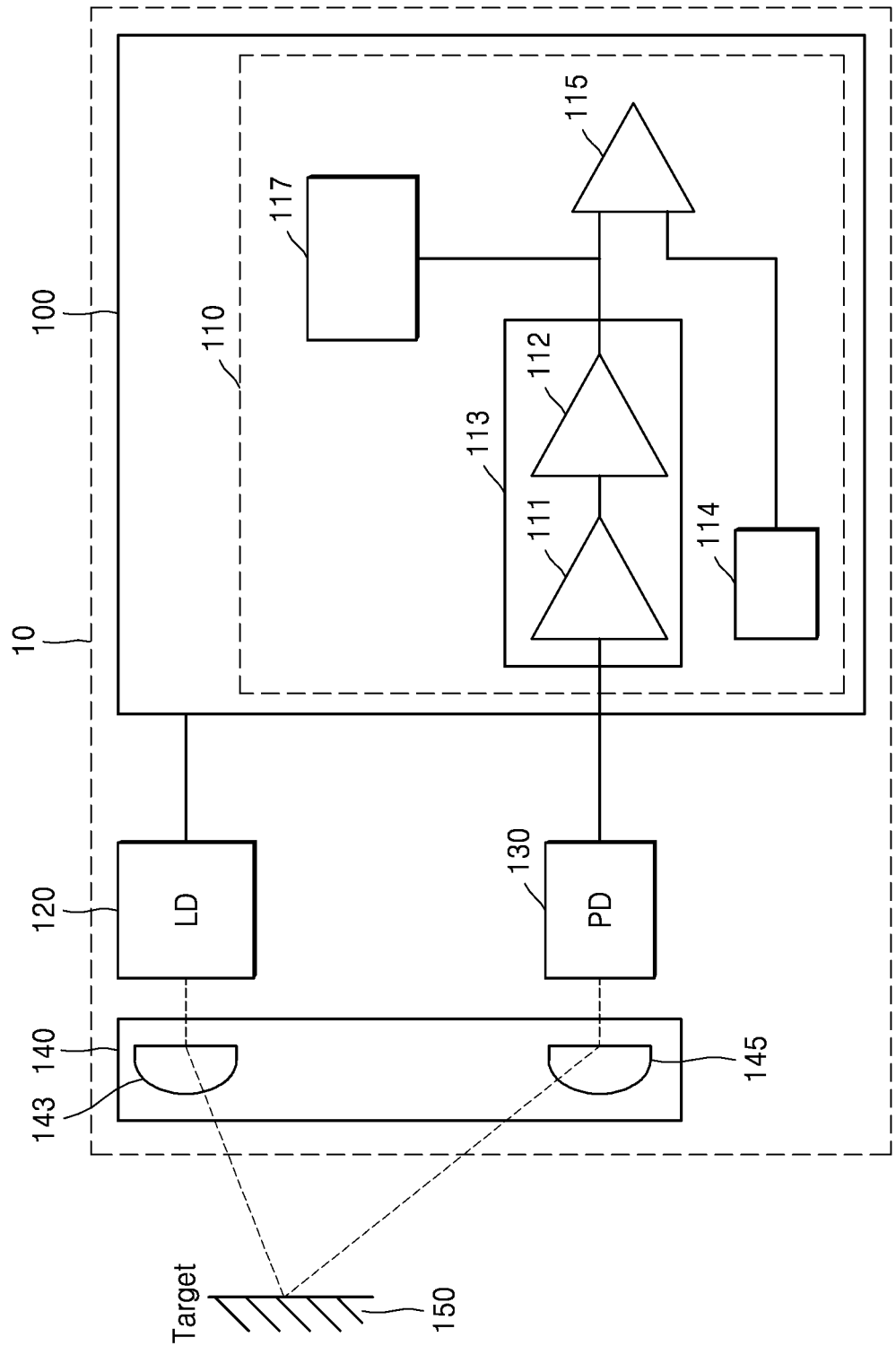
FIG. 1 is a block diagram showing a lidar system.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, exemplary forms of the present disclosure will be described in detail with reference to the accompanying drawings. However, it should be understood that the present disclosure is not limited to the forms described below and may be implemented in various forms different from each other. In addition, for convenience of description, sizes of constituent elements in the figures may be exaggerated or reduced. Further, the following forms are provided for helping those skilled in the art to fully understand the present disclosure and may be modified in various forms, and the scope of the present disclosure is not limited to the forms described below.

FIG. 1 is a block diagram showing a lidar system according to one form of the present disclosure.

Referring to FIG. 1, a lidar system 10 may include a controller 100, a laser diode 120, a photodiode 130, and an optical unit 140.

The laser diode 120 may be provided to transmit a laser pulse, and the photodiode 130 may be provided to receive a noise signal and a reflected wave signal reflected from an object 150 to which the laser pulse is applied.

The controller 100 may control the whole lidar sensor system and measure a time of flight (ToF). For example, the controller 100 may control the laser diode 120, the photodiode 130, and the optical unit 140 in order to drive the lidar system.

More specifically, the controller 100 may output a laser diode driving current to drive the laser diode 120.

For example, the laser diode 120 may be controlled by the controller 100 to transmit the laser pulse to the object 150 through the optical unit 140, and the reflected wave signal reflected from the object 150 to which the laser pulse is applied may be input to the photodiode 130 through the optical unit 140.

For example, the optical unit 140 may include lenses 143 and 145, prisms (not shown), and the like in consideration of optical characteristics such as uniformity of a laser emission distribution, a beam shaping ratio, and a light condensing power at the time of receiving light in order to secure a viewing angle and a precise angle resolution of the laser pulse transmitted from the laser diode 120.

On the other hand, the controller 100 may include a signal processor 110 which processes the noise signal, and the signal processor 110 may include an amplifier 113, a comparator 115, a digital-to-analog converter (DAC) 114, and an analog-to-digital converter (ADC) 117.

The amplifier 113 may receive the noise signal to amplify the noise signal and may include a transimpedance amplifier (TIA) 111 and a programmable gain amplifier (PGA) 112.

The comparator 115 may be connected to the amplifier 113 and may receive a noise signal amplified by the amplifier 113.

In this case, the digital-to-analog converter (DAC) 114 may input a threshold to the comparator 115, and the comparator 115 may compare an amplified noise signal with the threshold by comparing the amplified noise signal input from the amplifier 113 with the threshold input from the digital-to-analog converter 114.

The analog-to-digital converter (ADC) 117 may be connected between the amplifier 113 and the comparer 115 and receive the amplified noise signal from the amplifier 113 and converts it into a digital signal. In this case, the analog-to-digital converter (ADC) 117 may input the converted digital signal, that is, the noise signal, to the controller 100.

In this case, the controller 100 may monitor the noise signal received from the analog-to-digital converter (ADC) 117 and control the digital-to-analog converter (DAC) 114 in accordance with the monitored noise signal.

More specifically, the controller 100 may control the digital-to-analog converter (DAC) 114 to adjust the threshold in accordance with the monitored noise signal.

In this case, the controller 100 may receive the noise signal at predetermined time intervals, monitor the noise signal, and control the digital-to-analog converter (DAC) 114 to adjust the threshold in accordance with the monitored noise signal.

On the other hand, in the present disclosure, although a method for processing the noise signal in the signal processor 110 has been described, the signal processor 110 may also process the reflected wave signal received from the photodiode 130.

Meanwhile, the noise signal input to the signal processor 110 may be input to the signal processor 110 without driving the laser diode 120, and the noise signal may be a signal related external environmental information input through an external sensor other than a lidar sensor.

For example, the noise signal may be information related to temperature, weather, external light reflections or the like.

The controller 100 may receive the noise signal to monitor the noise signal, adjust the threshold in accordance with the monitored noise signal, and then receive the reflected wave signal through the photodiode 130 to calculate the time of flight (ToF).

In the present form, the controller 100 controls the lidar system 10 to process the noise signal to substantially increase a lidar sensing distance. In this sense, some or all constituents of the controller 100 including the signal processor 110 may also be referred to as an apparatus for increasing the lidar sensing distance.

Figure 2:
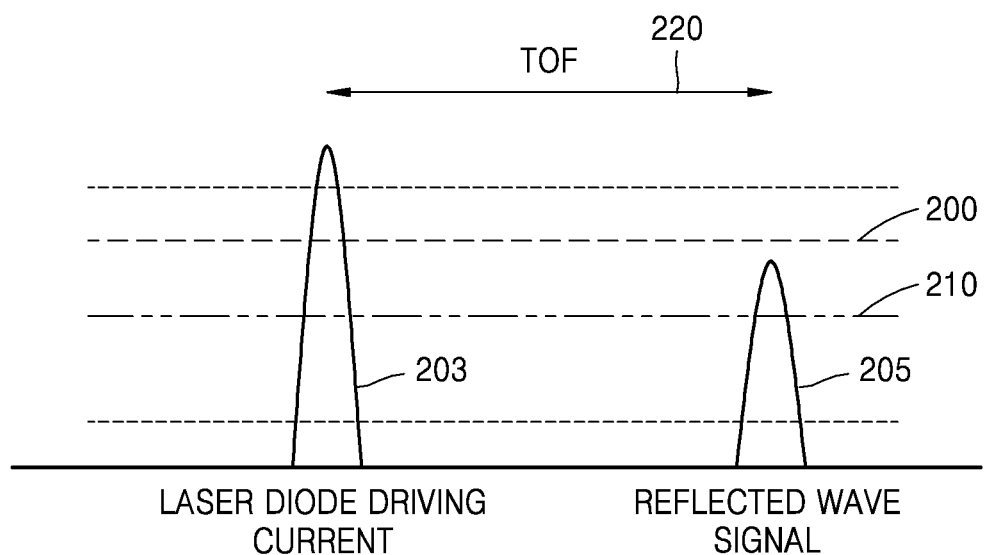
FIG. 2 is a diagram showing a signal waveform for explaining an adjustment of a threshold in a controller.

FIG. 2 is a diagram showing a signal waveform for explaining an adjustment of the threshold in the controller according to one form of the present disclosure.

Referring to FIG. 2, the controller 100 may apply a laser diode driving signal 203 for driving the laser diode 120 to the laser diode 120, check if the laser diode driving signal 203 is equal to or greater than the threshold 200, and determine the laser diode driving signal 203 to be a valid signal when the laser diode driving signal 203 is equal to or greater than the threshold 200.

However, when the laser diode 120 transmits a pulse signal to the object 150, a reflected wave signal 205 which is reflected from the object 150 to which the pulse signal is applied may gradually reduce due to an excessive distance or an obstacle so that a magnitude of the reflected wave signal 205 received by the photodiode 130 may become smaller.

Accordingly, conventionally, when the magnitude of the reflected wave signal 205 received from the photodiode 130 is compared with the threshold 200, the magnitude of the reflected wave signal 205 becomes less than the threshold 200 due to the decrease in the magnitude of the reflected wave signal 205 and thus a case in which the reflected wave signal 205 cannot be determined to be a valid signal occurs. Since the reflected wave signal 205 cannot not be determined to be a valid signal, a limitation in measuring the time of flight (ToF) 200 occurs.

However, in the present disclosure, even if the magnitude of the reflected wave signal 205 received from the photodiode 130 decreases due to a distance or an obstacle, the noise signal is first sensed before the reflected wave signal 205 reflected from the object 150 is received, the threshold 210 is adjusted in accordance with a monitored noise signal, and then the reflected wave signal 205 is input, whereby the reflected wave signal 205 may be determined to be a valid signal.

That is, the controller 100 may receive the noise signal and control the digital-to-analog converter 114 to reduce the threshold 210 applied to the comparator 115 in accordance with the received noise signal. Accordingly, even when the magnitude of the reflected wave signal 205 reduces, the reflected wave signal 205 may be compared with the threshold 210 reduced from the previous threshold 200 and thus determined to be a valid signal.

Accordingly, since the reflected wave signal 205 having a smaller magnitude that has not been sensed conventionally may be sensed, a sensible time of flight (ToF) 220 may increases.

Figure 3:
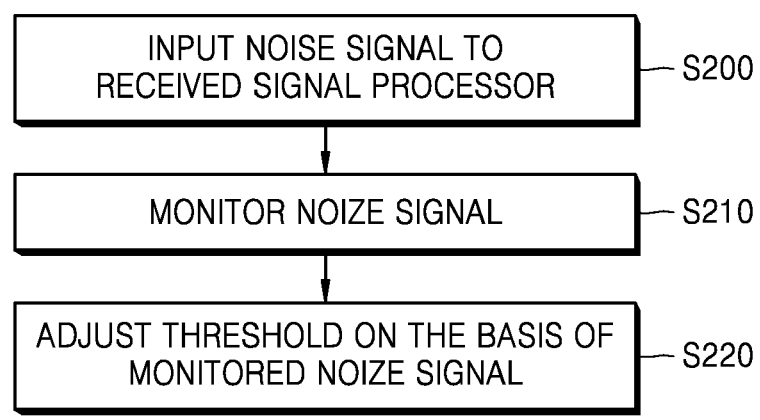
FIG. 3 is a flowchart showing a method for increasing a lidar sensing distance.

FIG. 3 is a flowchart showing a method for increasing a lidar sensing distance according to one form of the present disclosure.

Referring to FIG. 3, first, a noise signal may be input to the signal processor 110 (step S200).

In this case, the noise signal may be input to the signal processor 110 without driving the laser diode 120, and the noise signal may be a signal related to external environmental information input through an external sensor other than a lidar sensor.

On the other hand, after the noise signal is input to the signal processor 110, the noise signal may be monitored by the controller 100 (step S210).

More specifically, the noise signal is input to the amplifier 113 of the signal processor 110, the noise signal is amplified, and then the amplified noise signal is input to the comparator 115.

On the other hand, the amplified noise signal is also input to the analog-to-digital converter (ADC) 117, the analog-to-digital converter (ADC) 117 may input the noise signal to the controller 100.

In this case, the controller 100 may monitor the noise signal input through the analog-to-digital converter (ADC) 117, and the controller 100 may receive and monitor the noise signal at predetermined time intervals.

Finally, the controller 100 may adjust a threshold on the basis of the monitored noise signal (step S230).

After monitoring the noise signal, the controller 100 may control the digital-to-analog converter (DAC) 114 to adjust the threshold.

More specifically, the controller 100 may control the digital-to-analog converter (DAC) 114 on the basis of the monitored noise signal, and the threshold may be changed dynamically as the controller 100 controls the digital-to-analog converter (DAC) 114.

In addition, since the threshold can be adjusted, the threshold may be lowered when a magnitude of the reflected wave signal input to the photodiode 130 is smaller, thereby sensing a small reflected wave signal as a valid signal.

Since the apparatus for increasing the lidar sensing distance and the method for increasing the lidar sensing distance according to one form of the present disclosure configured as described above can monitor the noise signal and dynamically adjust the threshold in real time on the basis of the monitored noise signal, the reflected wave signal can be sensed even when a magnitude of the reflected wave signal received by the photodiode of the lidar sensor is reduced.

As a result, a sensing distance which is limited due to a decrease in the magnitude of the reflected wave signal resulting from an increase in distance, an obstacle or the like can be increased, and an object that has not been sensed can also be sensed.

While exemplary forms have been described with reference to the detailed description and the figures, it should be understood that the present disclosure is not limited thereto and those skilled in the art can make various substitutions, modifications and changes within a range not departing from the technical concept of the present disclosure. Therefore, the scope of the present disclosure should not be limited to the described forms, and should be construed as including not only the claims but also equivalents thereof.

EXPLANATION OF REFERENCES

100 Controller
110 Signal processor
113 Amplifier
114 Digital-to-analog converter
115 Comparator
117 Analog-to-digital converter
120 Laser diode
130 Photodiode

What is claimed is:

1. An apparatus for increasing a lidar sensing distance, comprising:
   a controller including a signal processor, the controller configured to process a noise signal, the signal processor including:
   an amplifier configured to amplify the noise signal;
   a comparator connected to the amplifier and configured to receive the amplified noise signal and to compare the amplified noise signal with a threshold;
   a digital-to-analog converter configured to input the threshold to the comparator; and
   an analog-to-digital converter connecting the amplifier and the comparator and configured to receive the amplified noise signal from the amplifier and to input the received amplified noise signal to the controller,
   wherein the controller is configured to control the digital-to-analog converter based on the amplified noise signal,
   wherein the signal processor is configured to process a reflected wave signal reflected from an object to which a laser pulse, transmitted by a laser diode included in a lidar sensor, is applied,
   wherein the controller is configured to determine a laser diode driving signal as a valid signal, if the laser diode driving signal is equal to or greater than the threshold, and to apply the laser diode driving signal to the laser diode for transmitting the laser pulse, and
   wherein the controller is configured to receive the noise signal to adjust the threshold after transmitting the laser pulse and then receive the reflected wave signal to calculate a time of flight.

2. The apparatus according to claim 1, wherein the controller is configured to control the digital-to-analog converter to adjust the threshold based on the amplified noise signal.

3. The apparatus according to claim 1, wherein the controller is configured to receive the noise signal at predetermined time intervals and control the digital-to-analog converter to adjust the threshold.

4. The apparatus according to claim 3, wherein the controller is configured to:
   receive external environmental information and the noise signal, and control the digital-to-analog converter to adjust the threshold.

5. The apparatus according to claim 1, wherein the amplifier includes a transimpedance amplifier (TIA) and a programmable gain amplifier (PGA).

6. The apparatus according to claim 1, wherein the noise signal input to the signal processor is configured to be applied to the signal processor without driving the laser diode.

7. The apparatus according to claim 1, wherein the controller is configured to dynamically adjust the threshold in real time on the basis of the received noise signal, when a magnitude of the reflected wave signal received by the photodiode is reduced.

8. A method for increasing a lidar sensing distance using a lidar apparatus including a controller having a signal processor, the method comprising:
   determining, by the controller, a laser diode driving signal as a valid signal, if the laser diode driving signal is equal to or greater than a threshold;
   applying, by the controller, the laser diode driving signal to a laser diode for transmitting a laser pulse;
   transmitting the laser pulse, by the laser diode;
   receiving, by the signal processor, a noise signal;
   monitoring, by the controller, the noise signal; and
   adjusting, by the controller, the threshold based on the monitored noise signal, after transmitting the laser pulse;
   processing, by the signal processor, a reflected wave signal reflected from an object to which the laser pulse is applied; and
   receiving, by the controller, the reflected wave signal to calculate a time of flight.

9. The method according to claim 8, wherein adjusting the threshold includes:
   controlling a digital-to-analog converter of the signal processor based on the noise signal so as to adjust the threshold.

10. The method according to claim 9, wherein the signal processor receives the noise signal at predetermined time intervals.

11. The method according to claim 8, wherein the noise signal is input to the signal processor without operating a lidar sensor.

12. The method according to claim 8, wherein adjusting the threshold includes:
    dynamically adjusting the threshold in real time on the basis of the received noise signal, when a magnitude of the reflected wave signal received by a photodiode is reduced.

13. A lidar system comprising:
    a laser diode configured to transmit a laser pulse;
    a photodiode configured to receive a noise signal and a reflected wave signal reflected from an object to which the laser pulse is applied; and
    a controller configured to control the laser diode and the photodiode, the controller including a signal processor and configured to process the noise signal,
    wherein the signal processor includes:
    an amplifier configured to amplify the noise signal;
    a comparator connected to the amplifier and configured to receive the amplified noise signal from the amplifier and compare the amplified noise signal with a threshold;
    a digital-to-analog converter configured to input the threshold to the comparator; and
    an analog-to-digital converter connecting the amplifier and the comparator and configured to receive the amplified noise signal from the amplifier and input the received amplified noise signal to the controller,
    wherein the controller is configured to control the digital-to-analog converter based on the amplified noise signal,
    wherein the signal processor is configured to process the reflected wave signal reflected from the object to which the laser pulse, transmitted by the laser diode, is applied,
    wherein the controller is configured to determine a laser diode driving signal as a valid signal, if the laser diode driving signal is equal to or greater than the threshold, and to apply the laser diode driving signal to the laser diode for transmitting the laser pulse, and
    wherein the controller is configured to receive the noise signal to adjust the threshold after transmitting the laser pulse and then receive the reflected wave signal to calculate a time of flight.

14. The lidar system according to claim 13, wherein the controller is configured to dynamically adjust the threshold in real time on the basis of the received noise signal, when a magnitude of the reflected wave signal received by the photodiode is reduced.

* * * * *